Jan. 29, 1946.   L. R. TITCOMB   2,393,841
TEMPERATURE CONTROL VALVE
Filed April 13, 1942   2 Sheets-Sheet 2
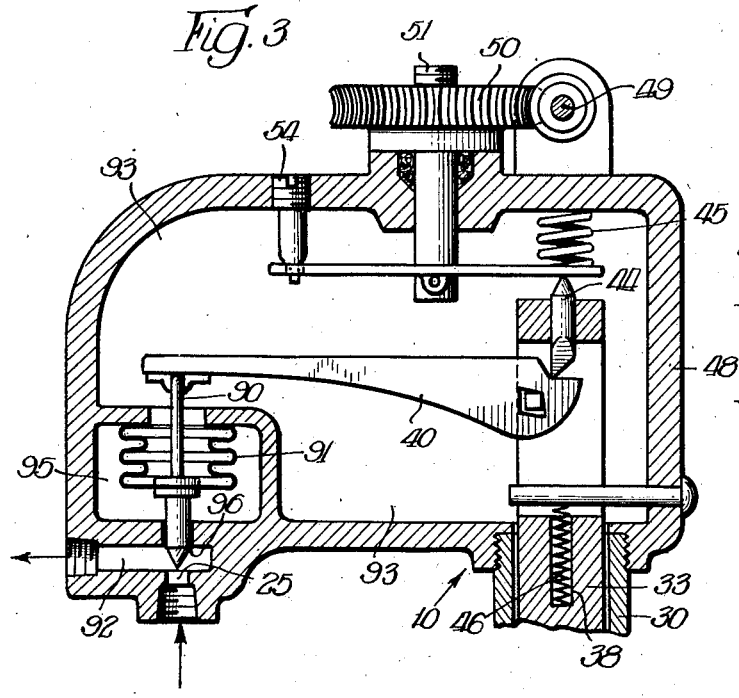
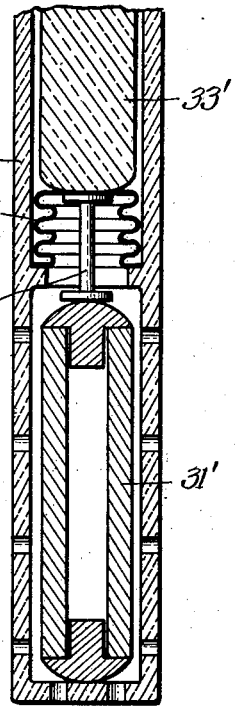
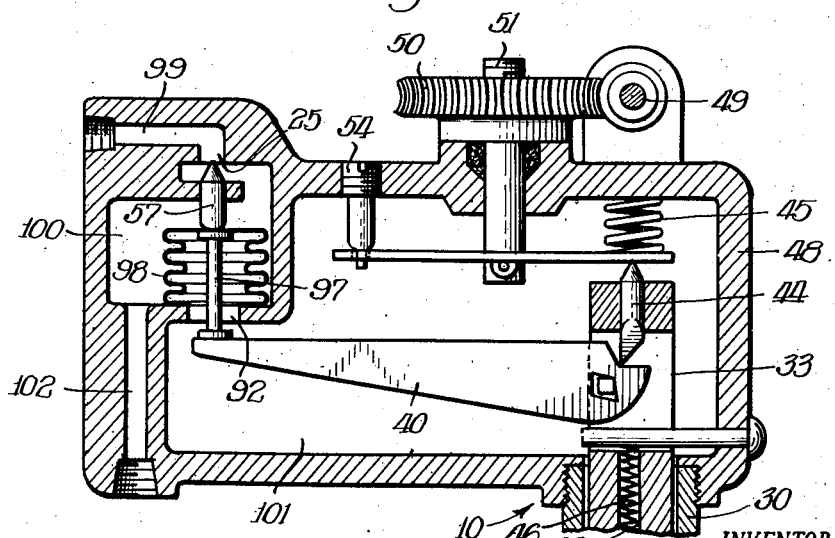
INVENTOR.
Lee R. Titcomb,
BY Patented Jan. 29, 1946

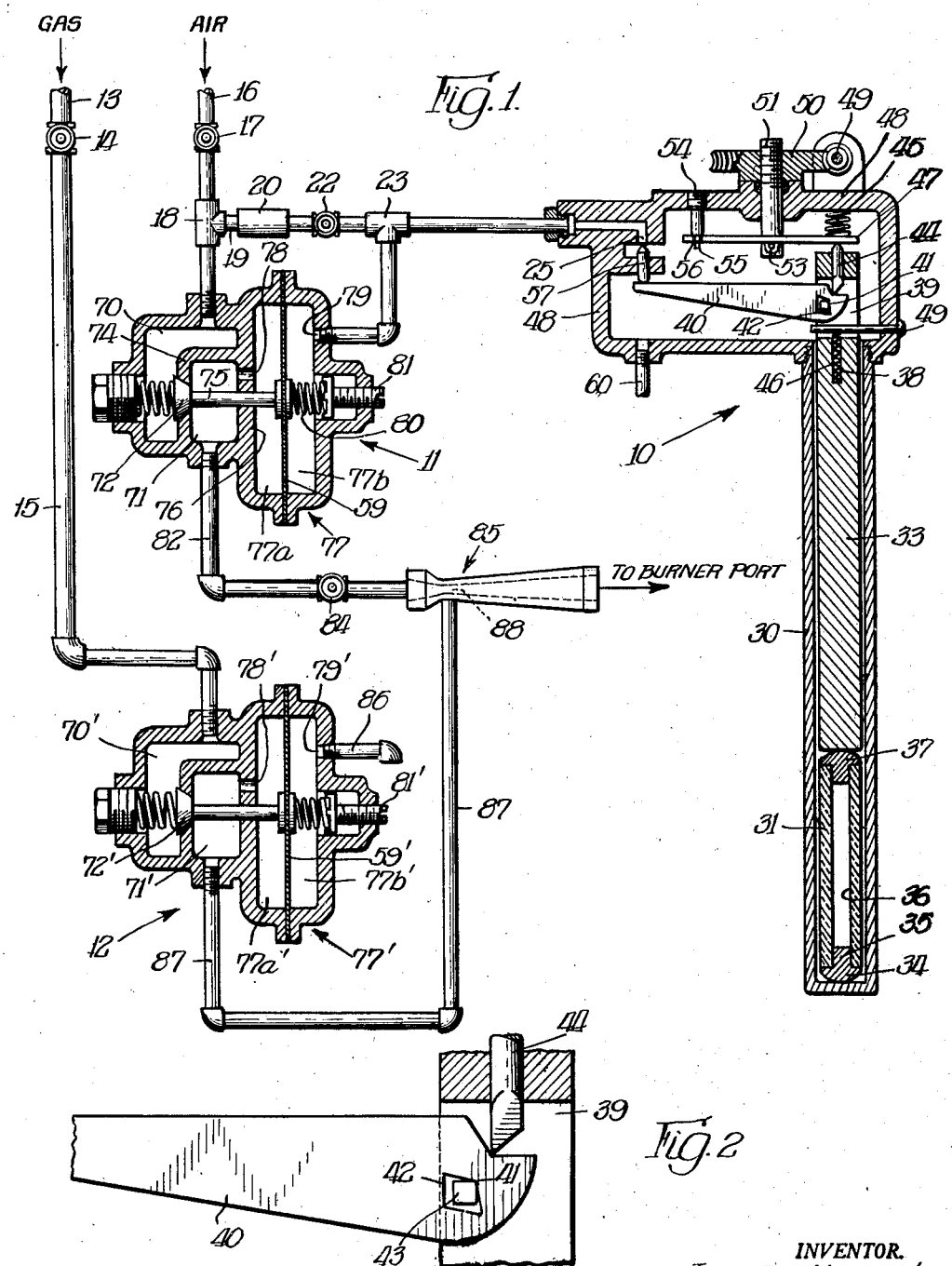

2,393,841

UNITED STATES PATENT OFFICE 2,393,841

TEMPERATURE CONTROL VALVE

Lee R. Titcomb, Chicago, Ill.

Application April 13, 1942, Serial No. 438,798

10 Claims. (Cl. 236—102)

This invention relates generally to a temperature control system and more particularly to a system the operation of which is based on different coefficients of expansion of materials forming its primary control member.

It is an object of this invention to provide a control system the primary control member of which is strong and powerful in its operation but yet which, if required, is delicately responsive to temperature variation of a fraction of a degree. It is also rapid in response, operating almost instantly under conditions such as might be produced by the momentary opening and closing of a furnace door.

The preferred embodiment of the invention herein illustrated and described is employed to regulate the flow of fuel to a burner port or nozzle. A primary control member of the device hereinafter also referred to as "pyrostat," of my control system is suitably located in the zone where temperature control is desired and regulates the flow of air to and through a zero pressure regulating valve. The flow through this valve regulates the flow of a combustible gas through a second zero pressure regulating valve. The gas and air are then mixed before entering the burner ports. The ratio of air to gas is initially determined by adjustment of component parts of the two zero pressure regulating valves, which adjustment results in a mixture which is fairly constant over a very wide range of burner operation.

It is another object of this invention to provide not only the usual "on" and "off" control, but particularly a modulating or throttling action for maintaining the temperature at a constantly equal level. Many of the contemporary control systems operate either to open fully or cut off completely the fuel supply, which action results in noticeable fluctuations in operating temperatures. The fluctuations may be aggravated by reason of the fact that many present day "on-off" control devices lack sufficient sensitivity to respond as quickly as is desired. Some of the contemporary devices do modulate the supply of fuel, but only in a series of definite steps—not for any desired setting as may be done by my device.

Another difficulty with controls now in common use is that they are not physically suited for action at high temperatures. They become distorted and fail to operate as desired. However, the primary control member of my system is strongly constructed of sturdy materials which can withstand high heat and the subsequent changes to lower temperature when, for example, the furnace or similar device is shut down at the end of an operating period.

My system has the further advantage of having its moving parts enclosed and thus preserved from deterioration. In addition, such of the parts as might be adversely affected by any excessive temperature of the space subject to control are sufficiently removed from the zone where the essential controlling parts are located so as to be fully protected.

So that the powerful action of the rather sizeable heat responsive parts employed may not damage the instrument itself when temperatures outside of its normal range of operation unexpectedly occur, a safety device is provided in the form of a stress-absorbing spring.

The primary control device of my invention, as above mentioned, is rugged, sturdy and easily constructed. And since the materials used are not expensive and since no expensive operations are necessary the control system has the further advantage of low production costs.

These and further advantages will become apparent as I describe, in connection with the accompanying drawings, a preferred embodiment of my temperature control system.

In the drawings:

Figure 1 is a longitudinal sectional view through the center of the primary control device and through the two zero pressure regulating valves;

Figure 2 is an enlarged view of the lever shown at the upper right of Figure 1;

Figure 3 is a section through a modified form of control device;

Figure 4 is a section through a modified form of control device; and

Figure 5 is a detailed sectional view of a modified portion of my control member, namely, the expansion tube and inside members.

Referring now to Figure 1, the primary control device, or pyrostat, of the system is indicated generally at 10. The zero pressure regulating valve controlling the supply of air is indicated generally at 11 and the zero pressure regulating valve in the gas line is indicated generally at 12. Both these aforesaid valves are of conventional design.

Gas main 13 has a shut-off valve 14. From the valve 14 a pipe 15 leads directly to the chamber 70' of the zero pressure regulating valve. The main air inlet 16 also has a shut-off valve 17. At 18 a tap 19 joins main 16. Tap 19 passes through an air filter 20 of conventional design and thence through a needle valve 22. At pipe fitting 23 the air path divides; one branch leading to chamber 77b of the zero pressure regulating valve 11 and the other branch leading to port 25 in the primary control element 10. The branch leading to the control device 10 may be a flexible metal hose for easier manipulation and insertion of the element into the device the temperature of which is to be controlled. This primary control device 10 will hereafter be referred to as a pyrostat for the sake of brevity.

The closed expansion tube 30 of the pyrostat 10 is inserted in the chamber which is being heated by the combustion of the mixed gases at the burner port. The burner port may be situated to suit the need of the heating problem involved. The upper threaded end of tube 30 is threaded into the housing 48, although a force fit or welded joint would be other appropriate ways of securing tube 30 to the housing 48. Within expansion tube 30 is a ceramic cylinder 31 and a solid cylindrical thrust rod 33 both of which slide freely in tube 30. Ceramic cylinder 31 rests on a spherical cap 34 the shank 35 of which fits loosely in the bore 36 of cylinder 31 and the bottom edge of which rests on the bottom of tube 30. A similar spherical cap 37 fits the cylinder 31 at its upper end. These two rounded caps 34 and 37 permit equalized distribution of any thrust on ceramic cylinder 31 the ends of which are ground off square. For general application four inches has been found a sufficient length for cylinder 31. The cylinder 31, rod 33 and associated parts constitute a core mounted in tube 30 for expansion and contraction independently thereof.

Thrust rod 33 is made of the same material as the tube 30 so that both have the same coefficient of expansion. Thrust rod 33 bears against the spherical cap 37. Near its upper end rod 33 has a slot milled out as at 39 to provide room for movement of the lever 40 which is fulcrumed at 41. Though a lever of the first class is illustrated and is preferable, a lever of the second class could equally well be used with a slight rearranging of parts. The fulcrum 41 is one corner of a square pin 43 which is borne by the thrust rod 33 as may be seen in Figure 2. The hole 42 in the lever 40 in which the pin 43 is located is trapezoidal in outline and so arranged that the corner having the largest interior angle is the corner baring on the upper right hand corner of the pin 43.

At the upper end of thrust rod 33 there is a drilled and reamed hole in which a push rod 44 moves freely in a longitudinal direction. Push rod 44 has a chisel shaped end which bears against the short arm of the lever 40. Rod 44 has flat sides at its lower end which fit within the milled slot 39 and which keep said rod from rotating. A spring 45 presses against push rod 44 through the regulating rocker arm 47 and may be fastened to the housing 48. Thrust rod 33 is prevented from rotating by a pin 49 which is fastened in the housing 48 and extends into the milled slot 39. The lower end of a small coil spring 46 bears against the bottom of the bore 38 in the rod 33, and the upper end of said spring 46 bears against the pin 49. This spring is important when the pyrostat 10 is used in such a position that the tube 30 is substantially horizontal. For, when horizontal, there is no action of gravity to return the previously heat-expanded cylinder 31 and rod 33 against the end of the tube 30 when they subsequently contract from cooling. Actuation of lever 40 is dependent upon movement of the rod 33 and therefor spring 46 is substituted to produce this necessary return motion. The spring 46 is not strong enough, however, to interfere at all with the movement of rod 33 when produced by the large forces due to expansion from heat.

The thrust rod 33 and expansion tube 30 for operations up to 2000° F. may consist of metal of the so-called 18–35 group, having low carbon and manganese content, 18% chromium and 35% nickel. For this material the thermal coefficient of expansion at 1000° C. or 1800° F. will be approximately $20 \times 10^{-6}$ per degree centigrade. Ceramic cylinder 31 at 1000° C. is approximately $3.3 \times 10^{-6}$ per degree centigrade. It is this relative difference in thermal coefficient of expansion between the expansion tube 30 and the ceramic cylinder 31 which provides the actuation of my control system. Above 2000° F. it is more satisfactory if the expansion tube 30 and thrust rod 33 are also made of a ceramic material, e. g., silicon carbide, which would stand the heat and also have a higher coefficient of thermal expansion than the ceramic cylinder 31. Any one of a number of ceramics having suitable coefficients of expansion and capable of withstanding high temperatures could be used.

In general practice a length of four inches for the ceramic cylinder 31 has been found satisfactory. Thrust rod 33 is longer but the overall length of this member beyond that necessary to extend well out of the heated zone has no appreciable effect on the operation of the control. The expansion tube 30 may extend well into the heated zone if desired, but a distance the length of the ceramic cylinder 31 is all that is required. If the tube 30 is inserted a greater distance, then the additional lengths of tube 30 and rod 33 are subjected to the heat of the chamber. This will result in greater expansion and contraction but since tube 30 and rod 33 have the same coefficients of expansion and since rod 33 heats up almost as quickly as tube 30, no change in operation of the pyrostat is produced after the initial positioning of the instrument. There is a slight time lag between the expansion of tube 30 and rod 33 due to the small gap between the tube and rod to permit a sliding fit.

Mounted on the top of the housing 48 is a manually rotated handle having a worm 49 which engages a worm wheel 50. Worm wheel 50 is threaded to receive the rocker-arm lift screw 51. Suitable choice of wheel and screw ratios permits index calibration of the regulating device to designate the operating temperature at which the pyrostat 10 will act to control the flame at the burner port. Regulating rocker-arm 47 is fulcrumed at its mid-portion on pin 53 which is secured in lift screw 51. Spring 45 presses rocker arm 47 at its right end and adjusting screw 54 acts as a limiting device at its left end restricting the rotation of rocker arm 47 in a clockwise direction. An extension 55 of adjusting screw 54 fits loosely within a hole 56 of the rocker arm 47 to guide its movement. Screw 54 is the zero adjustment used when tube 30 or thrust rod 33 should happen to be replaced by a member of a slightly different length. The metering pin 57 is actuated by the lever 40 to vary the opening of port 25. The diameter of the pin in the illustrated device is about $\tfrac{7}{64}$ inch and the port 25 is $\tfrac{1}{8}$ inch in diameter. The end of metering pin 57 which closes port 25 is conical in shape. When the port is opened by the withdrawal of pin 57, air will pass to the inside of the housing 48 from the pipe junction 23. When air can escape from port 25, the air that passes to chamber 77b of the zero pressure regulating valve 11 exerts less, or no, pressure on the diaphragm 59 so that the supply of air to the burner port is lessened or ceases and consequently the supply of gas to said burner port is lessened or stopped. When metering pin 57 is moved to close port 25, then all the air that passes through needle valve 22 passes to chamber 77b. My device through the movement of metering pin 57 has the ability to throttle the flame as well as to turn it completely on or off. This permits very even temperatures during operation and a minimum of temperature fluctuation. The air that passes into the housing 48 from port 25 escapes to the open air through vent pipe 60.

The two zero pressure regulating valves are of similar construction. Their size is dependent upon the maximum possible delivery of fuel at the burner port by the particular burner. In valve 11, for example, there are three chambers. Chamber 70 is connected to the air main 16 through shut off valve 17 and pipe coupling 18. Chamber 71 is connected to chamber 70 through a spring loaded valve 72 which is seated in the dividing wall 74. The valve stem 75 passes through a second wall 76 and is attached to an air tight diaphragm 59 which divides a third chamber 77 into two parts 77a and 77b. Wall 76 has an open hole 78 which permits equalization of air pressure between chambers 71 and 77a. A port 79 leads from 77b (the right half of chamber 77) through an air pipe threaded therein to the pipe junction 23 and needle valve 22. Diaphragm 59 is spring loaded by spring 80 which spring may be adjusted by screw 81. A pipe 82 which is threaded into the exterior wall of chamber 71 leads through a throttle valve 84 to Venturi tube 85. The Venturi tube leads to the burner port in the combustion chamber the temperature of which is to be controlled.

The construction of zero pressure regulating valve 12 is the same as valve 11 above described. The only differences are in the connections. Gas pipe 15, instead of the air main as in the above case, leads from shut off valve 14 to the chamber 70'. The pipe 86, which is threaded into port 79' of the third chamber 77', leads not to an air supply, but merely to atmosphere. And the pipe 87 leading from the middle chamber 71' to Venturi tube 85 passes through no shut-off valve since the flow of gas is dependent upon the flow of air from pipe 82 through the Venturi tube 85. The maximum flow from pipe 82 to Venturi tube 85 is controlled by throttle valve 84 which also serves as a shut-off valve as will be mentioned below.

The operation of this temperature control system will now be described. First, regulating adjustment 49—50 is rotated to set the pyrostat 10 for operation at some predetermined temperature. This setting adjusts the height of the fulcrum of the rocker arm 47. Assuming that the chamber in which expansion tube 30 is located is cold from disuse, said tube 30 and the cylindrical thrust rod 33 and ceramic cylinder 31 will all be contracted. Push rod 44 is pushed downwardly by spring 45 acting through the right hand end of rocker arm 47. Depression of push rod 44 will make lever 40 pivot in a clockwise direction and thereby push the metering pin 57 to close the port 25.

It might be well to point out here that spring 45 serves a second purpose other than the loading of push rod 44. If extreme and unexpected contraction of tube 30 occurs, the cylinder 31 will not be crushed because spring 45 is of such length and is so prestressed that it will absorb the compression which would otherwise be exerted by thrust rod 33 entirely on the cylinder 31.

Air valve 17 will then be opened wide to let air pass. At junction 18 the stream of air will divide up. Some air will pass through the filter 20 and needle valve 22 on to closed port 25 and also on into the chamber 77b through port 79. The rest of the air will pass to chamber 70 of the zero pressure regulating valve 11. Since air cannot escape at closed port 25 and since valve 72 of the zero pressure regulating device 11 is closed, the air from tap pipe 19 will flow into chamber 77b and exert a pressure on diaphragm 59. The total force on the left side of diaphragm 59 is less than on the right side so valve 72 is pushed open and air passes into chambers 71, 77a and pipe 82 on as far as throttle valve 84 which is shut for the time being.

Then gas shut-off valve 14 is opened so that gas will flow from main 13 along pipe 15 into chamber 70' of the zero pressure regulating valve 12. The gas is confined in chamber 70' because valve 72' is closed.

A torch is next applied to the burner port of the combustion chamber and throttle valve 84 is opened thus allowing air to pass through Venturi tube 85 to the burner port. Pipe connections 87, 87 lead from the neck 88 of Venturi tube 85 to chamber 71' of gas pressure regulating valve 12. The lowered pressure at neck 88 of Venturi tube 85 resulting from passage of air from throttle valve 84 entrains air in the pipes 87, 87 leading to chamber 71' which results in lowered pressure in chamber 71' and also in the chamber 77a' because of the passage 78' between the two chambers. Atmospheric pressure in the chamber 77b' then pushes on the diaphragm 59' and opens valve 72' permitting gas to pass through chamber 71' on to the neck 88 of the Venturi tube 85 where it is entrained and mixed with air from valve 84 in the proper proportion for desired efficiency of combustion. The ratio of gas to air is arranged beforehand by adjustment of the two zero pressure regulating valves 11 and 12. For any given adjustment the resulting mixture is reasonably constant over a very wide range of burner operation. After the burner has been lighted, throttle valve 84 is adjusted to give the maximum volume of flame desired.

The heat given off by combustion to the chamber, the temperature of which is to be controlled, causes the expansion tube 30 to expand downwardly since the upper end of tube 30 is fixed to the housing 48. Ceramic cylinder 31 also expands but not so much since its thermal coefficient of expansion is so much less than that of the tube 30 and since it fits within tube 30 loosely and thereby gains little heat by conduction. Radiation from tube 30 supplies most of the heat. On this account, there is a time lag in both heating and cooling. Thrust rod 33 has the same thermal coefficient of expansion as tube 30 but as it also fits loosely within tube 30, it also is subject to a time lag in temperature change.

Therefore, since tube 30 expands considerably and since ceramic cylinder 31 expands less than said tube, the net effect is to lower the top of rod 33, pivot point 41, and lever 40. However, lowering of lever 40 does not permit metering pin 57 to drop to open position during this initial heating period because spring 45 acting through rocker arm 47 continues to press on the short arm (right side) of lever 40 and consequently to rotate the left hand arm upwards against the pin 57. This action keeps metering pin 57 closed against port 25 until the temperature arrives near its predetermined setting. At that time regulating rocker arm 47 has been rotated clockwise by the spring 45 to such an extent that the left end of 47 is stopped in its movement by adjustment screw 54. Thereafter a continued lowering of the bottom of tube 30 causes the left hand arm of lever 40, by reason of its weight, to start rotating in a counterclockwise direction since push rod 44 is no longer spring loaded. This rotation allows metering pin 57 to recede from port 25 until counterclockwise rotation of lever 40 forces push rod 44 up against the spring-stressed regulating rocker arm 47. Further increase in temperature causes a further lowering of pivot point 41 and lever 40 and a consequent further recession of metering pin 57 from port 25. Opening port 25 in this manner permits escape of air which would otherwise go to chamber 77b of the zero pressure regulating air valve 11. Air escaping from port 25 passes through vent 60 to the exterior of housing 48. The contour of the point of the metering pin 57 determines the area of opening at port 25 for any given travel of pin 57 and the area of the opening in conjunction with air passage through needle valve 22 determines the amount of pressure above atmospheric which acts in chamber 77b on diaphragm 59 as will be more fully explained hereinafter. Since less pressure will now be exerted on diaphragm 59, valve 72 will be opened less and there will be a diminution of fuel supplied to the burner port. It will now be apparent why the original raising or lowering of rockerarm lift screw by manipulation of the worm 49 and worm wheel 50 acts to control the temperature at which the fuel supply will be regulated.

Now, ceramic cylinder 31 will heat more slowly as was explained above and will expand to its maximum length after tube 30 has reached its maximum expansion due to heating. That is, tube 30 will cease to expand after the heat input has been lessened, due to the opening of port 25, but cylinder 31 may at that time be just approaching its full expansion. The expansion of cylinder 31 after tube 30 has ceased to expand will result in a slight raising of thrust rod 33, pivot point 41 and lever 40, which will cause lever 40 to start to push metering pin 57 upwards again. This represents a transition point and soon the temperature inside the combustion chamber is lowered below its predetermined maximum by reason of lessened fuel input. Expansion tube 30 will then begin to contract. This results in a partial closure of port 25 by metering pin 57 by steps just the reverse of those above described. The resulting increase in the supply of fuel as port 25 is restricted and valve 72 opens will subsequently cause tube 30 to cease contracting. From the above described action it will be seen that the difference in coefficients of expansion of the tube 30 and cylinder 31 permits a modulating rather than on-off action.

For most practical applications my device is adjusted so that the usual abrupt on and off control of the flame, such as is now in common use, is avoided. The preferred method is to permit the temperature of the combustion chamber to approach within a few degrees of the predetermined maximum before allowing the flame to be altered, and then to throttle down the flame in proportion to further increase in temperature. Therefore when the peak temperature is attained the burner will be supplying only the heat needed to support the total heat losses. In this way a very even temperature is achieved. With reference to Figure 1, this preferred method of adjustment will now be more fully explained.

The regulating adjustment 49—50 is so designed and calibrated that the pin 57 begins to recede from port 25 prior to the predetermined setting so that by the time the predetermined temperature is reached port 25 is partially opened and air is passing therethrough. This results in the air pressure on diaphragm 59 being decreased to partially close the valve 72. If there were no heat losses at all from the oven it would, of course, be possible to shut valve 72 completely when the desired temperature was attained, but since there always are heat losses and since the rate of heat loss increases as the operating temperature increases valve 72 is arranged, by prior adjustment, to be kept partially open.

By prior analysis and study of the rates of heat loss of the particular oven within the normal range of its operating temperatures, it is possible to make adjustments so that valve 72 will allow just enough passage of air to the Venturi tube 85 to supply fuel sufficient to compensate for the loss of heat when any predetermined temperature has been reached. These adjustments may be arranged by varying the spring loads of the two zero pressure valves or by varying the position of screw 54 in the housing 48, but the preferred adjustment is the following:

The calibrated adjuster 49—50 is set for example for 1600° F. The calibrated setting is so established that it permits the pin 57 to begin withdrawing from port 25 about 25° F. in advance of the setting (i. e., 1575° F.) so that at the predetermined temperature (1600° F.) the pin has moved about .010–.011 of an inch from the port. In this position pin 57 is capable of opening the port still further so that it may be said to be in an intermediate position and have a certain amount of "play" in either direction at the moment when the desired temperature is attained. The needle valve 22 has previously been opened sufficiently so that when pin 57 is in its intermediate position the orifice at valve 22 is larger than at port 25. This means that not all the air pressure in pipe 19 will be able to escape through port 25 but enough will remain to act against diaphragm 59 of the air pressure regulating valve 11 to keep valve 72 also in some intermediate position. (This intermediate position will vary as will that of pin 57 in accordance with the rate of heat loss at the preset temperature, but there will always be sufficient range of "intermediate positions" to provide a modulating action for the normal range of operation of the oven.) Valve 72's position at this time will be such as to supply fuel to the burner port in such amounts as to overcome the rate of heat loss of that particular oven at that particular temperature. In this way a precise modulating action is obtained instead of an on-off action. Since the ovens manufactured by the same company according to the same specifications often vary considerably, as to heat losses it is necessary to initially adjust the needle valve 22 to compensate as above explained for the known heat losses of the particular oven to be controlled. Thereafter this temperature control system will maintain a very even temperature at any setting desired. It will be seen, from what has been said, that the tube 85 with its connections to pipes 82 and 87 constitutes an aspirator which regulates the delivery of fuel in accordance with the discharge of air through the aspirator, which air discharge is accurately controlled by the thermo-responsive control means. That renders possible handling of fuel in comparatively large volume and accurate control of the fuel so as to maintain the controlled temperature constant at the desired value, within permissible variations of but several degrees or less plus or minus, often an essential consideration in the use of industrial furnaces for heat treating operations and other purposes.

It is only necessary to expose that portion of expansion tube 30 immediately surrounding the ceramic cylinder 31 to the heating medium to obtain maximum normal response. The upper portion of tube 30 and thrust rod 33 are not affected by ambient temperature change which is not in the nature of an abrupt variation of a relatively large magnitude. The effect of any such undesirable fluctuation could be entirely eliminated by using any simple form of shield.

When the pyrostat 10 is used with its tube 30 lying in a substantially horizontal direction, the housing 48 should have its left end (as viewed in Figure 1) closest to the ground for that will permit lever 40 to continue to be pivoted on the same corner 41 of the square pin 43. With the device in this position the spring 46 will position rod 33 and cylinder 31 against the closed end of tube 30 whenever they would otherwise tend to lie out of contact with each other and the tube's end along the side of said tube 30. When the lever 40 is so positioned, as a result of the temperature's acting upon tube 30, rod 33 and cylinder 31, that it does not press pin 57 closed against port 25, then the air pressure in the passageway (instead of gravity as in Figure 1) will push the pin away from the port until pin 57 abuts against the tip of lever 40. This will permit the escape of air and, as previously described, will reduce the air pressure in the chamber 77b of air pressure regulating valve 11.

In the pyrostat illustrated the ceramic cylinder 31 is represented as being about four inches long. That, taken in connection with the relative differences in coefficient of expansion between the tube 30 and cylinder 31 and a mechanical advantage of 50:1 possessed by the lever arm 40, makes it possible to obtain full range operation of the burner by temperature variations in the order of $\frac{1}{10}°$ C. With the use of reasonable care and of precision zero pressure regulating valves, full range operation of the burner may be obtained by such slight fluctuations as $\frac{1}{100}°$ C.

While my temperature control system has been illustrated by the combination of the pyrostat 10 and the two zero pressure regulating valves 11 and 12, this illustration is not to be considered limiting but merely by way of example. It would be entirely practicable, for example, to connect zero pressure regulating valve 11 to the gas main instead of the air main, and completely eliminate the zero pressure regulating valve 12.

Or the pyrostat 10 could be used to control fluid flow directly and without any zero pressure regulating valves at all. In Figure 3 is a temperature control system which could be used to control a domestic heating plant, for example. The tube 30 would be inserted in the combustion chamber; or it could be located in a room of the building, though that would not be a satisfactory way of protecting the combustion chamber from reaching too high a temperature. It will be noted that lever 40 does not directly press against the metering pin 57 but, instead, by means of a thrust rod 90, presses an expansible bellows 91 which carries the metering pin 57. Rod 90 is pivoted at its upper end to lever 40 and is secured at its lower end to the inside bottom of bellows 91. The flow of gas in passageway 92 will be shut off from the main chamber 93 of housing 48 by bellows 91, though gas can get into chamber 95 through the guide hole 96. When the temperature of the combustion chamber approaches its predetermined maximum, tube 30 will elongate and thus lower thrust rod 33, as has been described earlier. As soon as rod 33 has been lowered sufficiently for the push rod 44 to be withdrawn from the action of spring 45, then the long arm of lever 40 drops due to the force of gravity and the natural spring action of bellows 91 and starts to close the gas entry port 25. This will cut down the supply of gas to the burners of the combustion chamber. Tube 30 will then lose its heat, contract, and force up thrust rod 33. As push rod 44 once more engages the load of spring 45 the long arm of lever 40 will be raised and gas will flow more rapidly again through port 25 and passageway 92 to the burners. Similar cycles of gas-flow modulation will follow.

If, instead of heating a chamber or room, it is desired to cool it to a certain minimum temperature, my device can also do that. In Figure 4 is the modified arrangement that permits this. Lever 40 pushes on a rod 97 which is attached at its upper end to the inside top of an expansible bellows 98. Bellows 98 prevents the passage of gas from passageway 99 and chamber 100 into the main chamber 101 of housing 48. The calibrated adjustment mechanism 49—50—51 is set for a certain minimum temperature. Above this temperature, cooling fluid will pass through passageway 99, port 25 and press pin 57, and through chamber 100 and the passageway 102 to the place to be cooled. As the minimum temperature is approached in the chamber, the temperature of which is to be controlled, contraction of tube 30 forces up thrust rod 33. Push rod 44 then engages the loaded spring 45 (through rocker arm 47) and consequently pivots lever 40 in a clockwise direction by bearing on its short arm. That rotation of lever 40 forces up rod 97, bellows 98 and metering pin 57. When the cooling fluid is shut off long enough, the place to be regulated may warm up. This will cause expansion of tube 30, a lowering of thrust rod 33 and a subsequent lowering of the long arm of lever 40. Pin 57 will move down and more cooling fluid will flow.

It is possible to arrange the pyrostat 10 differently without departing from the bounds of my invention, in the following manner: The thrust rod 33 inside the tube 30 in each case may be eliminated and replaced by a cylinder, like cylinder 31, of a length equal to the combined length of the illustrated cylinder 31 and thrust rod 33. In that case the cylinder would bear at its upper end the lever 40 and push rod 44. This is not as satisfactory as the illustrated devices, but may be used as an alternative.

Also it is possible in each case to reverse the positions of the cylinder 31 and of the tube 30 and thrust rod 33. That is, the parts formed of material of a greater coefficient of thermal expansion would be replaced by a material having the lesser coefficient of thermal expansion and vice versa. Tube 30 and thrust rod 33 could, for example, be made of a ceramic material and cylinder 30 could be made of metal. This, of course, would produce a different action—an action in a reverse direction—but would be possible, if desired. To explain the different action and a possible use thus produced by such inversion of coefficients of expansion, let us refer to Figures 3 and 4 again.

Figure 3 shows an arrangement for supplying fuel up to a maximum temperature. If tube 30 and thrust rod 33 were now replaced by parts of similar construction but of a material having a low coefficient of thermal expansion and if ceramic cylinder 31 (not shown) would then be replaced by a metal cylinder of greater coefficient of expansion, one could use the device of Figure 3 to provide a cooling medium instead of a heating medium to maintain a predetermined minimum temperature. For example, as the temperature of the space to be cooled begins to drop, the steel cylinder would contract most rapidly. This would result in the lowering of ceramic thrust rod 33. As soon as rod 33 lowered sufficiently—that is, approaching the predetermined temperature—the push rod 44 would be lowered beyond the range of the spring 45. Lever 40 would then pivot in a counterclockwise direction due to the weight of the long arm and port 25 would be closed by metering pin 57.

Similarly, in Figure 4 a similar interchange of materials between cylinder 31 (not shown) and the tube 30 and rod 33 would permit the illustrated device to supply fuel rather than a cooling medium to maintain a predetermined maximum temperature.

In case the tube 30 and thrust rod 33 are made of materials having a low coefficient of expansion and cylinder 31 is made of a material having a higher coefficient of expansion, it may be desirable to provide some means for allowing the enclosed cylinder 31 to be exposed to the ambient temperature so that it may react more quickly. To permit of quicker reaction to temperature fluctuations, a tube 30'—such as the one shown in Figure 5—may be provided. In the lower end, which is the end placed within the space to be controlled, there are numerous holes which permit the surrounding element to enter and directly cool or heat the cylinder 31'. So that the gas, fluid, or whatever it may be will not leak out along the upper part of tube 30', a bellows 105 may be interposed between cylinder 31' and thrust rod 33' at any suitable point. Cylinder 31' will then push up the bellows 105 when it expands and in that way raise rod 33'. Bellows 105 is fastened to the inner wall of tube 30' at its lower end; at its inside top it carries a rod 106 against which cylinder 31' bears. When cylinder 31' contracts, the weight of rod 33' will readily depress the bellows 105. The bellows serves only as a fluid seal.

In summation then, it is the chief purpose of this invention to provide a sturdy and rugged but very sensitive temperature control system that will not only provide an off and on action, but also a throttling action for the flow of heat or cold supplying mediums which pass to the chamber whose temperature is to be controlled.

From the above description it may be seen that my invention is adaptable to a variety of uses. The illustrated devices are not to be considered limiting except as they may be specifically recited in the appended claims for many variations are possible without departing from the scope or spirit of this invention.

I claim:

1. In combination, a housing, a tube secured at one end to said housing, a core having a materially different coefficient of expansion than said tube mounted in and free from the latter for independent expansion and contraction, said core comprising a thrust rod extending through said one end of said tube into said housing, a lever pivoted on a fulcrum carried by said rod at the end portion thereof extending into said housing, a push rod slidably mounted in said end portion of said thrust rod outwardly thereof beyond said lever and disposed for engagement at its inner end with said lever, a pivoted rocker arm having one end disposed to contact the outer end of said push rod, spring means disposed adjacent and acting on said one end of said arm urging said push rod toward said lever, an abutment member adjacent the other end of said rocker arm limiting movement thereof by said spring means, said housing having a valve port therein, and a valve member controlling said port urged in opening direction and having operating connection to said lever whereby movement of the latter about its fulcrum by said spring means moves said valve member in closing direction.

2. In combination, a housing, a tube secured at one end to said housing, a core having a materially different coefficient of expansion than said tube mounted in and free from the latter for independent expansion and contraction, said core comprising a thrust rod extending through said one end of said tube into said housing, a lever pivoted on a fulcrum carried by said rod at the end portion thereof extending into said housing, a push rod slidably mounted in said end portion of said thrust rod outwardly thereof beyond said lever and disposed for engagement at its inner end with said lever, a pivoted rocker arm having one end disposed to contact the outer end of said push rod, spring means disposed adjacent and acting on said one end of said arm urging said push rod toward said lever, an abutment member adjacent the other end of said rocker arm limiting movement thereof by said spring means, means for adjusting the position of the pivotal axis of said rocker arm, said housing having a port therein, and a valve member controlling said port urged in opening direction and having operating connection to said lever whereby movement of the latter about its fulcrum by said spring means moves said valve member in closing direction.

3. In combination, a housing, a tube secured at one end to said housing, a core having a materially different coefficient of expansion than said tube mounted in and free from the latter for independent expansion and contraction, said core comprising a thrust rod extending through said one end of said tube into said housing, a lever pivoted on a fulcrum carried by said rod at the end portion thereof extending into said housing, a push rod slidably mounted in said end portion of said thrust rod outwardly thereof beyond said lever and disposed for engagement at its inner end with said lever, a pivoted rocker arm having one end disposed to contact the outer end of said push rod, spring means disposed adjacent and acting on said one end of said arm urging said push rod toward said lever, an abutment member adjacent the other end of said rocker arm limiting movement thereof by said spring means, means for adjusting said abutment member toward and away from said other end of said rocker arm, said housing having a valve port therein, and a valve member controlling said port urged in opening direction and having operating connection to said lever whereby movement of the latter about its fulcrum by said spring means moves said valve member in closing direction.

4. In combination, a housing, a tube secured at one end to said housing, a core having a materially different coefficient of expansion than said tube mounted in and free from the latter for independent expansion and contraction, said core comprising a thrust rod extending through said one end of said tube into said housing, a lever pivoted on a fulcrum carried by said rod at the end portion thereof extending into said housing, a push rod slidably mounted in said end portion of said thrust rod outwardly thereof beyond said lever and disposed for engagement at its inner end with said lever, a pivoted rocker arm having one end disposed to contact the outer end of said push rod, spring means disposed adjacent and acting on said one end of said arm urging said push rod toward said lever, an abutment member adjacent the other end of said rocker arm limiting movement thereof by said spring means, means for adjusting the position of the pivotal axis of said rocker arm, means for adjusting said abutment member toward and away from said other end of said rocker arm, said housing having a valve port therein, and a valve member controlling said port urged in opening direction and having operating connection to said lever whereby movement of the latter about its fulcrum by said spring means moves said valve member in closing direction.

5. In combination, a housing, a tube secured at one end to said housing, a core having a materially different coefficient of expansion than said tube mounted in and free from the latter for independent expansion and contraction, said core comprising a thrust rod extending through said one end of said tube into said housing, a lever pivoted on a fulcrum carried by said rod at the end portion thereof extending into said housing, a push rod slidably mounted in said end portion of said thrust rod outwardly thereof beyond said lever and disposed for engagement at its inner end with said lever, a rocker arm pivoted on said housing yieldingly held in contact with the outer end of said push rod, means limiting movement of said arm toward said thrust rod, said housing having a valve port therein, and a valve member controlling said port having operating connection to said lever whereby movement of the latter responsive to movement of said thrust rod toward said rocker arm moves said valve member in one direction and movement of said lever responsive to movement of said thrust rod away from said rocker arm moves said valve member in the opposite direction.

6. In combination, a housing, a tube secured at one end to said housing, a core having a materially different coefficient of expansion than said tube mounted in and free from the latter for independent expansion and contraction, said core comprising a thrust rod extending through said one end of said tube into said housing, a lever pivoted on a fulcrum carried by said rod at the end portion thereof extending into said housing, a push rod slidably mounted in said end portion of said thrust rod outwardly thereof beyond said lever and disposed for engagement at its inner end with said lever, and a rocker arm pivoted on said housing yieldingly held in contact with the outer end of said push rod.

7. In combination, a housing, a tube secured at one end to said housing, a core having a materially different coefficient of expansion than said tube mounted in and free from the latter for independent expansion and contraction, said core comprising a thrust rod extending through said one end of said tube into said housing, a lever pivoted on a fulcrum carried by said rod at the end portion thereof extending into said housing, a push rod slidably mounted in said end portion of said thrust rod outwardly thereof beyond said lever and disposed for engagement at its inner end with said lever, a rocker arm pivoted on said housing yieldingly held in contact with the outer end of said push rod, and means limiting movement of said arm toward said thrust rod.

8. In combination, a housing, a tube secured at one end to said housing, a core having a materially different coefficient of expansion than said tube mounted in and free from the latter for independent expansion and contraction, said core comprising a thrust rod extending through said one end of said tube into said housing, the end portion of said rod within said housing having a transverse slot terminating short of the end of said rod, a lever pivoted in said slot on a fulcrum carried by said rod and having a short arm extending into said slot and a long arm extending outwardly therefrom, a push rod slidable in said end of said thrust rod with its inner end engaging the short arm of said lever, yielding means carried by said housing contacting the outer end of said push rod urging the latter toward said lever and having limited movement toward said thrust rod, said housing having a valve port, and a valve member controlling said port having operating connection to the long arm of said lever whereby movement of the latter responsive to movement of said thrust rod toward said rocker arm moves said valve member in one direction and movement of said lever responsive to movement of said thrust rod away from said rocker arm moves said valve member in the opposite direction.

9. In combination, a housing, a tube open at one end and there secured to said housing and closed at its other end, a core having a materially different coefficient of expansion than said tube mounted in the latter in contact with the closed end thereof and free from said tube for independent expansion and contraction, said core comprising a thrust rod extending into said housing, the end portion of said rod within said housing having a transverse slot terminating short of the end of said rod, means restraining said rod against turning movement and yieldingly holding it in contact with the closed end of said tube comprising a member carried by said housing and extending into said slot, a lever pivoted in said slot on a fulcrum carried by said rod and having a short arm extending into said slot and a long arm extending outwardly therefrom, a push rod slidable in said end of said thrust rod with its inner end engaging the short arm of said lever, yielding means carried by said housing contacting the outer end of said push rod urging the latter toward said lever and having limited movement toward said thrust rod, said housing having a valve port, and a valve member controlling said port having operating connection to the long arm of said lever whereby movement of the latter responsive to movement of said thrust rod toward said rocker arm moves said valve member in one direction and movement of said lever responsive to movement of said thrust rod away from said rocker arm moves said valve member in the opposite direction.

10. In combination, a housing, a tube secured at one end to said housing, a core having a materially different coefficient of expansion than said tube mounted in and free from the latter for independent expansion and contraction, said core comprising a thrust rod extending through said one end of said tube into said housing, the end portion of said rod within said housing having a transverse slot terminating short of the end of said rod, a lever pivoted in said slot on a fulcrum carried by said rod, a push rod slidable in said end of said thrust rod with its inner end engaging said lever, spring means carried by said housing contacting the outer end of said push rod urging the latter toward said lever, adjustable means limiting movement of said spring means toward said thrust rod, said housing having a valve port therein, and a valve member controlling said port having operating connection to said lever whereby movement of the latter responsive to movement of said thrust rod toward said spring means moves said valve member in one direction and movement of said lever responsive to movement of said thrust rod away from said spring means moves said valve member in the opposite direction.

LEE R. TITCOMB.